US010458791B2

(12) United States Patent
Guma et al.

(10) Patent No.: US 10,458,791 B2
(45) Date of Patent: Oct. 29, 2019

(54) LEVEL WITH QUICK-DISCONNECT END CAP

(71) Applicant: Stanley Black & Decker, Inc., New Britain, CT (US)

(72) Inventors: Jarrett J. Guma, Newington, CT (US); Vincent Cook, Milford, CT (US)

(73) Assignee: Stanley & Black & Decker, Inc., New Britain, CT (US)

( * ) Notice: Subject to any disclaimer, the term of this patent is extended or adjusted under 35 U.S.C. 154(b) by 45 days.

(21) Appl. No.: 15/678,835

(22) Filed: Aug. 16, 2017

(65) Prior Publication Data
US 2019/0056225 A1  Feb. 21, 2019

(51) Int. Cl.
*G01C 9/16* (2006.01)
*G01C 9/26* (2006.01)

(52) U.S. Cl.
CPC ................................ *G01C 9/26* (2013.01)

(58) Field of Classification Search
CPC ............................................. G01C 9/28
USPC ................................ 33/379, 381
See application file for complete search history.

(56) References Cited

U.S. PATENT DOCUMENTS

| 3,003,054 A | 10/1961 | Hubbard | |
|---|---|---|---|
| 4,419,833 A * | 12/1983 | Wright | G01C 9/32 33/379 |
| 5,412,876 A * | 5/1995 | Scheyer | G01C 9/28 33/350 |
| 5,709,034 A * | 1/1998 | Kohner | G01C 9/28 33/365 |
| 6,792,686 B2 | 9/2004 | Krehel et al. | |
| 6,988,320 B2 | 1/2006 | Kallabis et al. | |
| 7,150,106 B2 * | 12/2006 | Kallabis | G01C 9/26 33/365 |
| 7,360,316 B2 | 4/2008 | Hoover et al. | |
| D582,808 S * | 12/2008 | Cook | G01C 9/28 D10/69 |
| 7,513,056 B1 * | 4/2009 | Hobden | B25H 7/00 248/466 |
| 7,770,298 B1 | 8/2010 | Wojciechowski et al. | |
| 7,900,366 B2 * | 3/2011 | Spaulding | G01C 9/32 33/348 |
| 8,424,217 B2 | 4/2013 | Murray et al. | |
| 8,925,212 B2 | 1/2015 | Allemand | |
| 9,052,191 B1 | 6/2015 | Keate | |
| 2003/0163927 A1 | 9/2003 | Kallabis et al. | |
| 2005/0223577 A1 | 10/2005 | Scarborough | |

(Continued)

FOREIGN PATENT DOCUMENTS

DE  2724870  7/1978
WO  2016077737 A1  5/2016

*Primary Examiner* — George B Bennett
(74) *Attorney, Agent, or Firm* — Gabriel A. Haboubi

(57) ABSTRACT

A level includes an end cap releasably attached to a level body. The end cap is configured to be inserted in, and withdrawn from, the level body with a sliding fit. Accordingly, the end cap can be withdrawn from the level body simply by squeezing with the fingers of one hand two opposing actuators formed in the end cap against the bias of respective living hinges to release detents from detent apertures formed in opposing side walls of the level body, and then using the same hand to slide the end cap out of the level body without having to touch the level body with either hand.

20 Claims, 6 Drawing Sheets

(56) References Cited

U.S. PATENT DOCUMENTS

| | | | |
|---|---|---|---|
| 2006/0248738 A1* | 11/2006 | Tran | G01C 9/26 33/451 |
| 2008/0282562 A1* | 11/2008 | Allemand | G01C 9/28 33/379 |
| 2009/0313839 A1 | 12/2009 | Spaulding et al. | |
| 2010/0000105 A1 | 1/2010 | Zhang et al. | |
| 2010/0257745 A1* | 10/2010 | Sparrow | G01C 9/32 33/382 |
| 2013/0091717 A1 | 4/2013 | Steele et al. | |
| 2013/0167387 A1* | 7/2013 | Lueck | G01C 9/28 33/374 |
| 2013/0192075 A1* | 8/2013 | Sanchez | G01C 9/28 33/379 |
| 2016/0138916 A1* | 5/2016 | Neitzell | G01C 9/36 33/381 |
| 2016/0138918 A1* | 5/2016 | Neitzell | G01C 9/34 33/381 |
| 2018/0094925 A1* | 4/2018 | MacKey | G01C 9/26 |

* cited by examiner

LEVEL WITH QUICK-DISCONNECT END CAP

BACKGROUND OF THE INVENTION

1. Field of the Invention

The present invention relates to levels, and in particular to levels with removable end caps.

2. Description of the Related Art

Levels, including levels with one or more horizontal and/or vertical bubble vials, may be provided with end caps having generally rounded shock-absorbing pads to protect the levels against drops. However, it is desirable that the end caps be removable so that, for example, the flat end of the level can be placed flush against one surface, while determining whether adjoining surfaces are level.

There have been several iterations of levels with removable end caps. Some end cap-removal systems require tools, which immediately put the operator at a disadvantage. Several attach the end cap using variations of a securing member that can releasably engage the body of the level directly. Others use multi-piece end cap subassemblies that must be removed in their entireties to expose the flat end of the level. These systems present several disadvantages: they are counter-intuitive; they include end caps which are difficult to insert and remove; they are poorly executed; and/or they require more than one hand to remove the end cap. Furthermore, many conventional end cap subassemblies add additional, non-productive length to the level. These issues frequently frustrate an operator to such an extent that the operator simply stops using the removable feature, or else permanently removes the end cap.

What is needed, therefore, is a level with an end cap that can be easily and securely attached to the level body, but that can nevertheless be quickly removed with just one hand.

SUMMARY OF THE INVENTION

It has been discovered that by configuring the end cap to have a sliding fit in the level body, the desired intuitive one-handed removal operation can be achieved.

Accordingly, in one embodiment of the present invention of a level having a removable end cap, the end cap is configured to be inserted in, and withdrawn from, the level body with a sliding fit. This is in contrast to conventional level/end cap subassemblies, in which the end cap is directly or indirectly attached to the level body with either a press-fit or with mechanisms which create a similar resistance to withdrawing the end cap from the level body. In the present invention, however, the end cap is released simply by squeezing with the fingers of one hand two discrete opposing actuators formed in the end cap against the bias of respective living hinges to release detents from corresponding detent apertures formed in opposing side walls of the level body. The operator then uses the same hand to slide the end cap out of the level body. Inasmuch as the end cap is configured to be inserted in, and withdrawn from, the level body with a sliding fit, there is virtually no resistance to removing the end cap once the detents are released. Consequently the operator need not grasp the level body with the other hand to remove the end cap, nor is it necessary for the operator's fingers to be removed from the actuators during the removing process.

When it is desired to reinsert the end cap, it is not necessary for the operator to compress the actuators. The operator simply inserts the end cap into the level body, which itself biases the detents inwardly against the force of the living hinges until there is an audible "click", which indicates that the detents have securely engaged the detent apertures.

In another embodiment, the end cap is connected to the level body via an interface, which itself is connected inside the level body. The interface includes two opposing side walls in which are formed the detent apertures. The end cap is configured to be inserted in, and withdrawn from, the interface with a sliding fit, the detents engaging the detent apertures in the interface. An operator thus can remove the end cap from the interface (and thereby from the level body) with just one hand, as was noted above. Again, when it is desired to reinsert the end cap, the operator simply inserts the end cap into the interface until there is an audible "click", which indicates that the detents have securely engaged the detent apertures.

In another embodiment, the interface is attached to the body of the level using a connector, including a hollow rivet inserted in a hang hole formed in the side walls of the level body. The hollow rivet is then inserted into aligned through-holes formed in the side walls of the interface.

In still another embodiment, the connector includes a set of elongated connector detents formed in the side walls of the interface which engage and are held within mating connector detent receptors formed in the side walls of the level body.

In yet another embodiment, the connector includes a plurality of screws which fasten together respective side walls of the level body and the interface via corresponding screw-holes.

In a further embodiment, the end cap is releasably attached to the level body by first inserting the interface into the level body and fixedly attaching it thereto so that an end of the interface is substantially flush with an end of the level body, and then inserting the end cap into the interface so that detents formed in the end cap releasably engage edges of corresponding detent apertures formed in the interface.

In another embodiment, the end cap is first releasably attached to the interface as set forth above, and then the interface is fixedly connected to the level body.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the root terms "include" and/or "have", when used in this Specification, specify the presence of stated features, steps, operations, elements, and/or components, but do not preclude the presence or addition of at least one other feature, step, operation, element, component, and/or groups thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

For definitional purposes and as used herein, "connected" or "attached" includes physically or electrically attached, whether directly or indirectly, fixedly or adjustably mounted, as, for example, "an end cap is connected to a level body."

Thus, unless otherwise specified, "connected" or "attached" is intended to embrace any operationally functional connection.

As used herein, "substantially," "generally," "slightly" and other words of degree are relative modifiers intended to indicate permissible variation from the characteristic so modified. It is not intended to be limited to the absolute value or characteristic which it modifies, but rather possessing more of the physical or functional characteristic than its opposite, and approaching or approximating such a physical or functional characteristic.

In the following description, reference is made to the accompanying Drawings, which are provided for illustration purposes as representative of specific exemplary embodiments in which the invention may be practiced. Given the following description of the Specification and Drawings, the apparatus and methods should become evident to a person of ordinary skill in the art. Further areas of applicability of the present teachings will become apparent from the description provided herein. It is to be understood that other embodiments can be utilized, and that structural changes based on presently known structural and/or functional equivalents can be made, without departing from the spirit or scope of the invention.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying Drawings, wherein:

FIG. 11 C serves a dual purpose. It also illustrates a level according to another embodiment of the present invention, in which the end cap is directly attached to the level body.

Corresponding reference characters indicate corresponding parts throughout the several views. The exemplifications set out herein illustrate embodiments of the present invention, and such exemplifications are not to be construed as limiting the scope of the present invention in any manner.

DETAILED DESCRIPTION OF THE INVENTION

Figure 1:
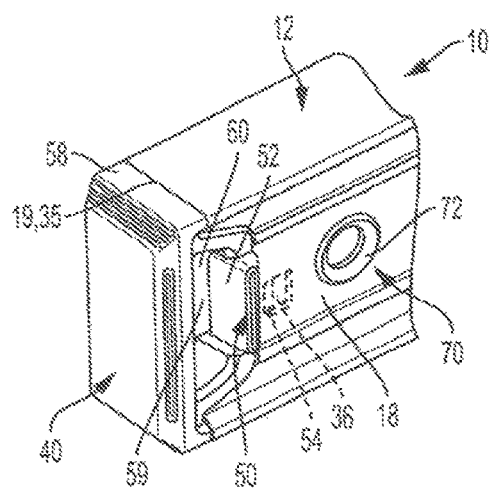
FIG. 1 is an enlarged perspective detail view of a portion of a level according to an embodiment of the present invention, illustrating the end cap attached to the level subassembly.
Figure 2:
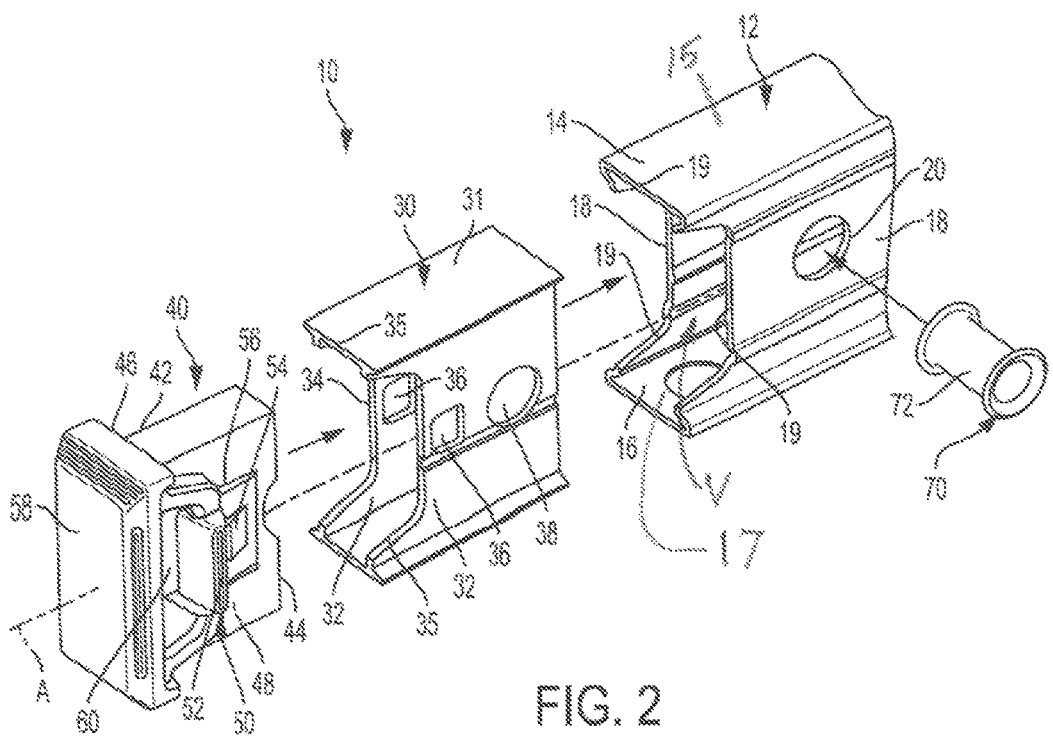
FIG. 2 is an enlarged exploded perspective detail view of the level of FIG. 1.

Apparatuses, systems, and methods embodying features, principles, and concepts of various exemplary embodiments of a level of the present invention will be described with reference to the Drawings. Referring to FIGS. 1-5, an embodiment of the level is shown generally as 10. As shown in FIGS. 1 and 2, the level 10 includes a level body 12, which may have a generally hollow rectangular cross-section, into which is inserted an interface 30 and an end cap 40, the interface being fastened to the level body by a connector 70. Although a "box beam level" is shown in the Drawings, the present invention may be adapted for use with levels having an "I"-beam cross-section, as well. For clarity, the Figures depict only an end portion of various embodiments of the level of the present invention. An example of a complete level is shown in U.S. Pat. No. 6,792,686, issued Sep. 21, 2004 to Krehel et al., the entire disclosure of which is incorporated herein by reference.

Still referring to FIGS. 1 and 2, the level body 12 includes an end portion 14, which defines an end portion aperture 16 and opposing parallel side walls 18. The end portion aperture 16 terminates in a concave outer edge 19. Aligned hang holes 20 are formed in the side walls 18. In an embodiment, the level body 12 may be formed from an extruded metal, such as aluminum. In other embodiments, the level body 12 may be formed from any suitable material.

As shown in FIG. 2 (and for all of the embodiments of the level of the present invention described herein), the level body 12 defines a level volume "V". The level volume "V" is that space bounded by a top wall 15, a bottom wall 17 and the side walls 18 of the level body 12, out to the end portion concave outer edge 19.

The interface 30 includes an upper wall 31 and parallel interface side walls 32. The interface side walls 32 in turn define an interface end aperture 34 and a detent-retaining portion, which may include aligned detent apertures 36. In an embodiment, the detent apertures 36 may be rectangular, in other embodiments the detent apertures may be any geometric shape suitable for retaining a detent, as discussed below. The interface end portion aperture 34 terminates in a concave interface outer edge 35. As is particularly shown in FIG. 1, when the interface 30 is fully inserted in the level body end portion aperture 34, their respective level body and interface outer edges 19, 35 become substantially flush. The parallel interface side walls 32 also define aligned through-holes 38 which, when the interface 30 is fully inserted in the end portion 14 of the level body 12, are in registration with hang holes 20. In an embodiment, the interface may be formed of ABS plastic; in other embodiments the interface may be formed of any material suitable for the uses set forth herein.

Figure 3:
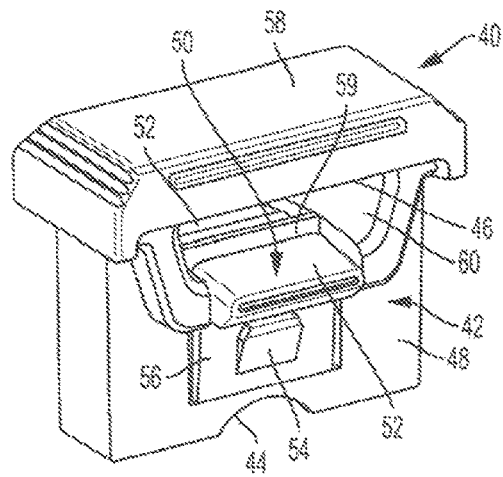
FIG. 3 is an enlarged perspective detail view of the end cap of FIG. 1.
Figure 4:
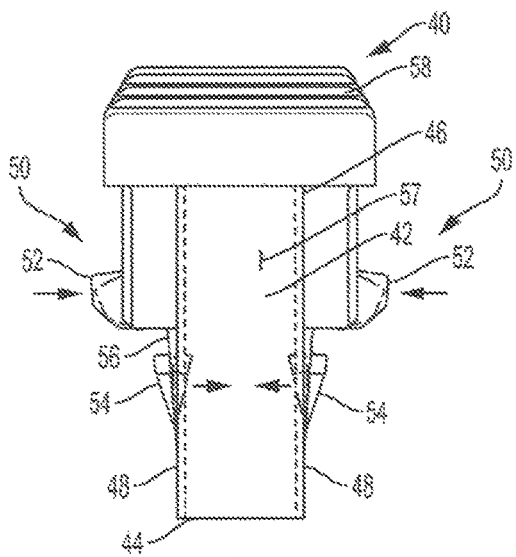
FIG. 4 is an enlarged elevational detail view of the end cap of FIG. 3.
Figure 5:
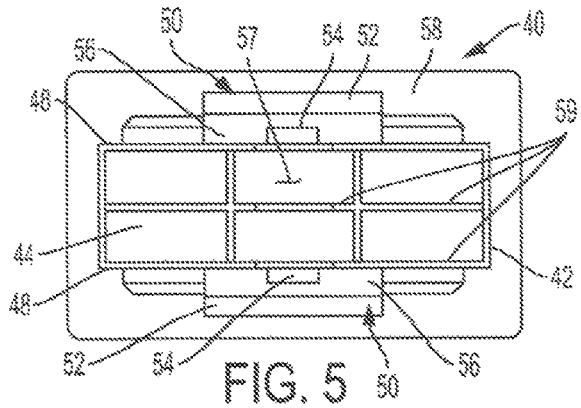
FIG. 5 is enlarged bottom plan view of the end cap of FIG. 3.

1 As shown in FIGS. 3-5, the end cap 40 includes an end cap body 42, which in turn includes an open end 44 and a closed end 46. The end cap body 42 defines two opposed parallel side walls 48. A living hinge set 50 is formed in each end cap side wall 48, and includes a discrete actuator 52 and a discrete detent 54, both configured to be held by edges of corresponding detent apertures 36 when the end cap 40 is inserted into the interface 30. Each actuator 52 and detent 54 is connected by a living hinge 56. (The engagement of the detent 52 of the end cap 40 with an edge of a detent aperture 36 formed in a side wall 32 of the interface 30 is shown in phantom in FIG. 1.) The end cap 40 further defines a cavity 57 into which the detents 54 may be pressed by squeezing the actuators 52 inwardly (as shown by the arrows in FIG. 4, and by the positions of the actuators 52 and detents 54 shown in phantom) until the detents are flush with or below the surfaces of the end cap side walls 48, thereby permitting the detents 54 to be disengaged from respective detent apertures 36.

In an embodiment, the end cap body 42 may be configured so that a convex region around the actuators 52 may be nested within the mating concave outer edges 19, 35 (see FIG. 1). This arrangement provides a compact, intuitive and ergonomic guide for the operator's fingers to engage the actuators 52 to remove the end cap 40. Furthermore, as shown in FIGS. 1 and 2, the end cap 40 is configured so that the actuator 52 is disposed outside the level volume "V" when the end cap is inserted into the interface 30. These attributes are also common to all of the embodiments of the present invention described herein.

In an embodiment, the end cap body 42 (including actuators 52, detents 54 and living hinges 56) may be formed as a single unitary body of ABS plastic, but in other embodiments, the end cap may be formed of any suitable material from which a living hinge set 50 may be formed. Furthermore, in other embodiments, the living hinge set 50 may be formed as separate components within a multi-piece end cap.

In any event, the interface 30 and the end cap 40 are configured so that the end cap may be inserted into, and withdrawn from, the interface with a sliding fit.

A shock-absorbing portion 58 is disposed on the closed and 46 of the end cap 40 so that, if the level 10 is dropped on its end, the end cap 40 will protect the level from the impact. In an embodiment, the shock-absorbing portion 58 may be formed of TPE thermoplastic elastomer ("thermoplastic rubber"), although in other embodiments the shock-absorbing portion may be formed of any material suitable for the purpose of cushioning an impact of the end of the level 10 with a surface.

Now referring to FIG. 5, a plurality of ribs 59 are disposed within the hollow body 42 of the end cap 40 to provide structural strength and to provide a limit which prevents the actuators 52 from being squeezed past a certain point (see FIG. 3). An auxiliary hang hole 60 is formed within the end cap 40 adjacent the shock-absorbing portion 58.

An embodiment of a method for assembling the end cap 40 to the body 12 of the level 10 is illustrated in FIG. 2. The interface 30 is first inserted into the end portion aperture 16 of the level body 12 so that the through-holes 38 of the interface are in registration with the hang holes 20 in the end portion side walls 18 of the level body, and so that the configuration of the interface end aperture 34 is substantially aligned with the configuration of the end portion aperture 16 of the level body (see FIG. 1). A connector 70, in the form of a hollow rivet 72, is then inserted into the hang hole 20 and through-holes 38 of the level body 12 and interface 30, respectively, and riveted in place to fasten the interface to the level body. The hollow rivet 72 thus enables an operator to hang the level 10 from a hook or other protrusion. In the embodiments shown, the connector 70 is independent of the end cap 40.

Referring to FIGS. 2 and 3-5, the open end 44 of the end cap 40 is then slidably inserted into the interface end aperture 34 of the interface 30 along axis "A" so that the detents 54 are pressed inwardly against the bias of the living hinge 56 by the side walls 32 of the interface 30. Thus the operator need not depress the actuators 52 in order to insert the end cap 40 into the interface 30. The operator continues to move the end cap 40 axially into the interface 30 until the detents 54 reach respective detent apertures 36 in the interface side walls 32. Now the living hinge 56 biases the detents 54 into engagement with edges of respective detent apertures 36 with an audible "click" to releasably connect the end cap 40 to the interface 30, and therefore to the body 12 of the level 10. The audible "click" thus notifies the operator that the assembly is complete.

In other embodiments, the end cap 40 may be attached via the interface 30 to the level body 12 by first inserting the end cap into the interface end aperture 34 until respective detents 54 engage edges of respective detent apertures 36, and then inserting the end cap/interface subassembly into the end portion aperture 16 of the level body. The interface 30 may be fastened to the level body 12 via a connector 70, in the same manner as was discussed above. It should be noted that the detents 54 are inaccessible to the exterior of the level 10 when the end cap 40 is connected to the subassembly of the interface 30 and the level body 12, thereby making it difficult for the end cap to be released from the level body merely, for example, by the level 10 striking against a wall. However, in the event one detent 54 is accidentally dislodged from its corresponding detent apertures 36, the other detent of the other living hinge set 50 still retains the end cap 40 on the interface 30, and therefore on the level body 12.

In other embodiments, a living hinge set 50 may be formed in only one end cap side wall 48 to engage a corresponding detent aperture 36 formed in only one of the interface side walls 32. In such embodiments, it may be desirable to form a larger detent 54 to engage a correspondingly larger detent aperture 36. In this event, the actuator 52 may be offset in the end cap side wall 48 and asymmetric, relative to the larger detent aperture 36 in the interface side wall 32. Consequently only one actuator 52 needs to be depressed to disconnect the enlarged detent 54 from the detent aperture 36.

Figure 6:
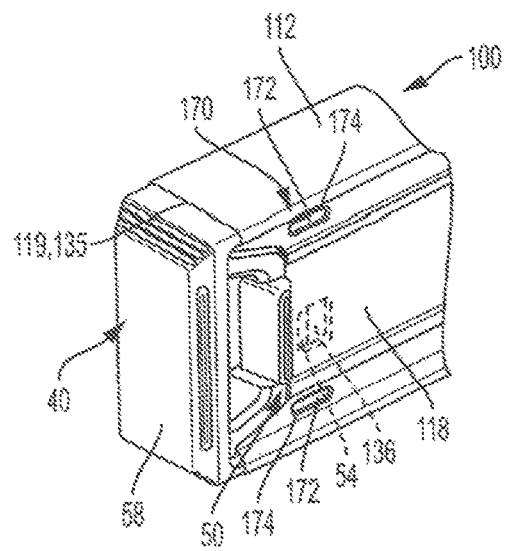
FIG. 6 is a view similar to that of FIG. 1, and illustrating a level according to another embodiment of the present invention.
Figure 7:
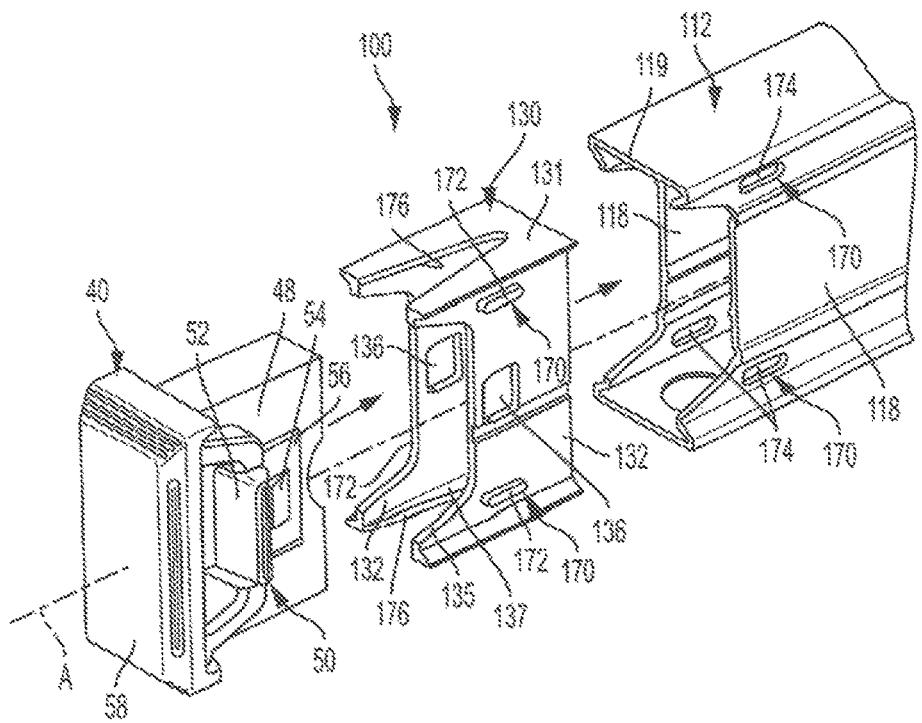
FIG. 7 is a view similar to that of FIG. 2, and is an exploded perspective view of the level of FIG. 6.

Another embodiment of a level 100 according to the present invention which enables the same one-handed removal operation as set forth above is shown in FIGS. 6 and 7. In this embodiment, the configuration of the end cap 40 is the same as that used in the level 10. The primary differences associated with the level 100 concern the type of connector 170 used to fasten the interface 130 to the level body 112.

The level body 112 includes side walls 118 which define a concave outer edge 119. The interface 130 includes interface top and bottom walls 131, 137 and interface side walls 132, which define a concave outer edge 135. The interface side walls 132 define respective detent apertures 136, which cooperate with detents 56 on the end cap 40 in the same way as was discussed above with respect to level 10. The connector 170 includes elongated connector detents 172 formed on the exterior of each interface side wall 132, and which cooperate with mating connector detent receptors 174 defined by the level body side walls 118. When the interface 130 is inserted into the level body 112, the elongated connector detents 172 engage the mating connector detent receptors 174, thereby firmly connecting the interface 130 (and therefore the end cap 40) to the level body. However, in order for elongated connector detents 172 to clear the outer edge 119 of the level body 112, a squeeze-gap 176 needs to be formed in the top and bottom walls 131, 137 of the interface 130. Now the operator can squeeze the interface side walls 132 inwardly, thereby allowing the elongated connector detents 172 to clear the edge 119 of the level body 112. As the operator continues to insert the interface 130 into the level body 112, the elongated connector detents 172 can then snap into mating connector detent receptors 174, and the interface has thus become firmly attached to the level body. In other embodiments, the elongated connector detents 172 may be formed on the level body side walls 118 instead, and the mating connector detent receptors 174 may be formed in the interface side walls 132. In further embodiments, the connector detents and detent receptors may be formed with any suitable geometries.

Figure 8:
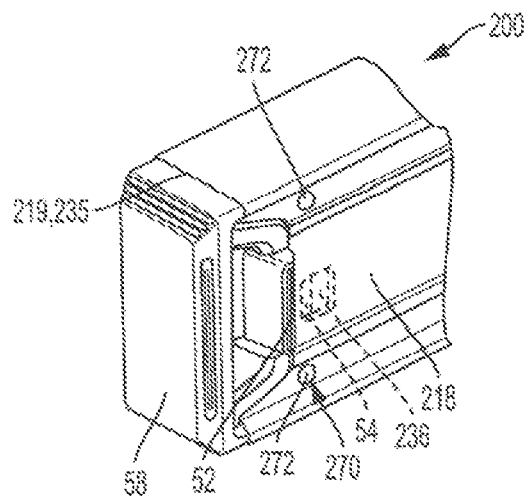
FIG. 8 is a view similar to that of FIG. 1, and illustrates a level according to still another embodiment of the present invention.
Figure 9:
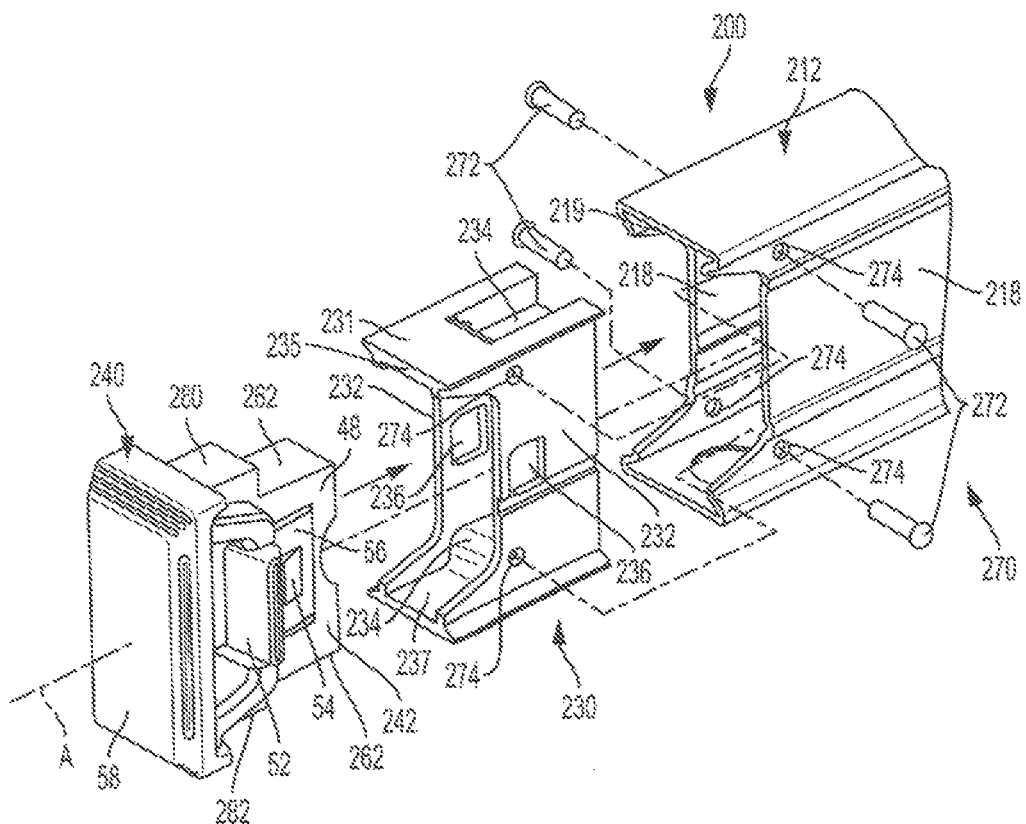
FIG. 9 is a view similar to that of FIG. 2, and is an exploded perspective view of the level of FIG. 8.

Still another embodiment of a level 200 according to the present invention (which also enables the same one-handed removal operation set forth above) is illustrated in FIGS. 8 and 9. Again, the primary differences in this embodiment are associated with the type of connector 270 used to fasten the interface 230 to the level body 212.

The level body 212 includes two opposing parallel side walls 218, which define a concave outer edge 219. The interface 230 includes opposing parallel side walls 232, and top and bottom walls 231, 237, which together define a concave outer edge 235. The interface side walls 232 also define two opposed detent apertures 236, edges of which detent apertures are engaged by respective detents 54 formed on the end cap 240, as was discussed above with respect to the end cap 40 of level 10. A sunken region 234 is formed in the top and bottom walls 231, 237 of the end cap 240, adjacent respective screw holes 274 formed in the interface side walls 232. The sunken region 234 provides additional material into which the end portions of a fastener (such as a screw) 272 may be driven.

The end cap 240 is identical to the end cap 40 discussed above with respect to the level 10, except that there is a clearance region 262 formed in top and bottom surfaces 280, 282 of the end cap. The clearance regions 262 are thus able to clear the sunken regions 234 in the interface 230 when the end cap 240 is inserted into the interface.

Connector 270 includes a plurality of fasteners 272, which fasten the interface 230 to the level body 212 via mating holes 274 in the interface and the level body. In an embodiment, the fasteners 272 may be screws, but in other embodiments, the fasteners may be any connector suitable for fastening together the interface 230 and the level body 212.

In the embodiment of FIG. 8, the screws 272 are shown exposed. However, in other embodiments, the end cap 240 may be configured to cover the screws 272 when the end cap is assembled to the interface 230. In addition, the interface 230 may define internally-threaded posts to accept the screws 272.

Figure 10:
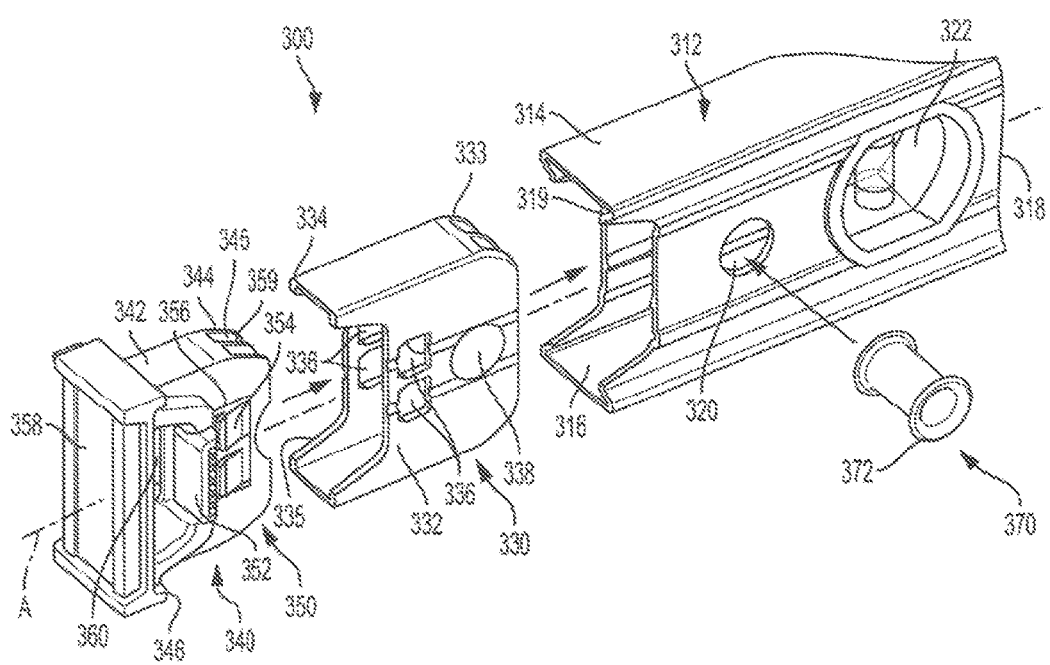
FIG. 10 is an exploded perspective view of a level according to a further embodiment of the present invention.

A further embodiment of a level 300 according to the present invention is shown in FIG. 10. The primary difference between this embodiment and the one illustrated in FIG. 2 is that the end cap living hinge sets 350 include a single actuator 352, which moves a plurality of detents 354 against the bias of a living hinge 356. As is the case with the living hinge set 50, the end cap 340 and the end cap living hinge set 350 may be formed as a single unitary plastic body. The plurality of detents 354 engage a plurality of corresponding detent apertures 336 formed in the interface side walls 332 when the end cap 340 is fully inserted into the interface 330. The plurality of detents 354 provide an additional measure of retention stability when the end cap 340 is connected to the interface 330. The interface 330 also includes a tapered nose portion 333, which enables quicker assembly of the interface into the level body 312. Similarly, the end cap 340 also includes a tapered nose portion 345, which enables quicker assembly of the end cap into the interface 330. A bubble vial assembly or level vial 322 is supported by the level body 312. In the embodiment shown in FIG. 10, there are two detents 354 which cooperate with two detent apertures 336 disposed on each side of the level 300. However, in other embodiments, the plurality of detents 354 and detent apertures 336 may be greater than two. Also, in the level 300 shown in FIG. 10, the connector 370 is essentially the same as the connector 70 used in the level 10 shown in FIG. 2. However, in additional embodiments, the connector 370 may be similar to the connectors 170 or 270 in the embodiments shown in FIGS. 7 and 9, respectively.

In still further embodiments, instead of a plurality of detent apertures 336 being formed in the interface 332 to cooperate with mating detents 354 of the end cap 340, a single large detent aperture, which cooperates with the plurality of detents, may be formed in the side walls 332 of the interface 330.

In any event, the remaining elements of the level 300 of FIG. 10 may be similar if not identical to corresponding elements of the level 10 shown in FIG. 2, with the difference being that the corresponding reference numerals in FIG. 10 begin with the prefix "3".

Figure 11A:
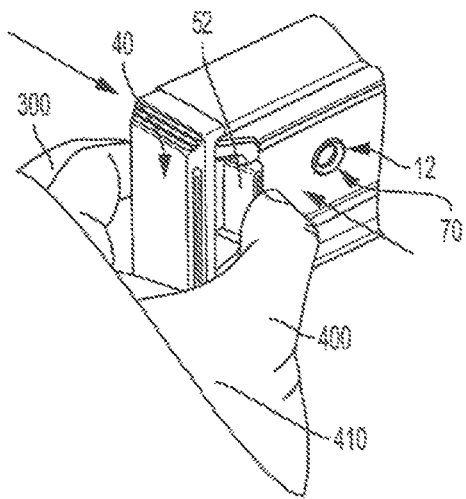
FIGS. 11A-11C are progressive enlarged perspective schematic views of a level according to the present invention, illustrating a process of the present invention for withdrawing the end cap from the level body using only one hand.
Figure 11B:
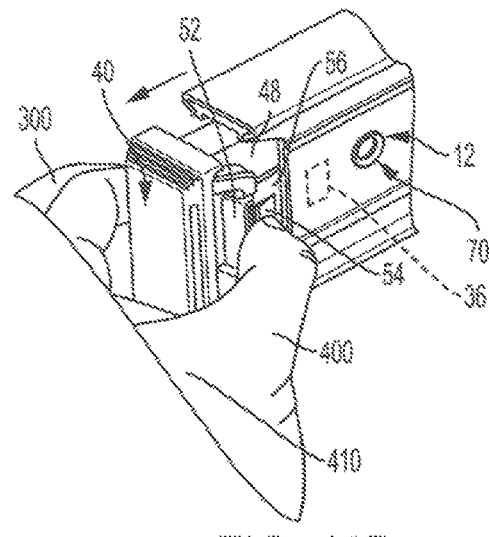
Figure 11C:
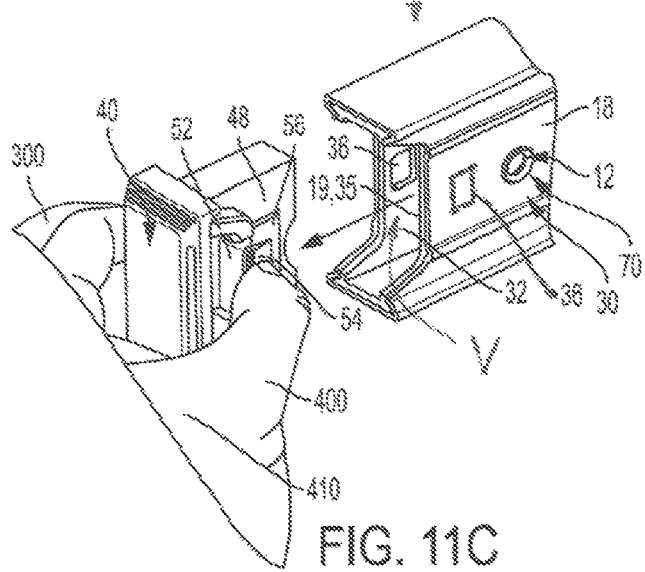

When it is desired to remove the end cap 40 from any of the embodiments of the levels 10, 100, 200 and 300 of the present invention, an operator need only follow the process illustrated in FIGS. 11A-11C (which shows, for example, the embodiment of the level 10). Using the fingers 400 of one hand 410, the operator squeezes respective actuators 52 inwardly against the bias of their respective living hinges 56 until their respective detents 54 clear the edges of corresponding detent apertures 36. As shown in FIG. 11C, without having to remove fingers 400 from the actuators 52, the operator then simply slides the end cap 40 completely out of the subassembly of the level body 12 and interface 30, leaving the interface 30 fixedly connected to the level body.

FIG. 11C also illustrates a level 500 according to another embodiment of the present invention. In the event it is desired to eliminate the interface 30 from the level 500, for example, for cost reasons, the end cap 40 may be inserted directly into the level body 12. In this embodiment, connectors 70 are eliminated, and the interface shown in FIG. 11C is also removed. The detent aperture 36 is shown in solid in this Figure for this embodiment. However it will be understood that in the embodiment in which the interface 30 remains as part of the level 500, FIG. 11C would show the detent aperture in phantom.

For the level 500, the end cap 40 is configured to be inserted into, and withdrawn from, the level body 12 with a sliding fit. All of the elements of the end cap 40 remain the same as was discussed above with respect to the level 10 of the present invention. Also the level body 12 still defines the level volume "V", outside of which level volume are disposed respective actuators 52. Accordingly an operator may insert the end cap 40 directly into the level body 12 until the detents 54 engage respective detent apertures 36 thereby producing the audible "click". The operator may thereafter remove the end cap 40 from the level body 12 by squeezing respective actuators 52 inwardly against the bias of their respective living hinges 56 until their respective detents 54 clear the edges of corresponding detent apertures 36. Without having to remove fingers 400 from the actuators 52, the operator then simply slides the end cap 40 completely out of the level body 12, as again shown in FIG. 11C It thus can be seen that the various embodiments of a level with compact, quick-disconnect end caps according to the present invention enable an operator to easily insert an end cap into a level body, and then to remove the end cap using only the fingers of one hand.

While the present invention has been described with respect to embodiments of a level with a removable end cap, the present invention may be further modified within the spirit and scope of this disclosure to apply to other products as well. This Application is therefore intended to cover any variations, uses, or adaptations of the present invention using its general principles. The accompanying Drawings illustrate exemplary embodiments of the invention. Alternative embodiments, examples, and modifications which would still be encompassed by the invention may be made by those skilled in the art, particularly in light of the foregoing teachings. The examples and alternative embodiments described above may be combined in a variety of ways with each other. Further, the steps and number of the various steps illustrated in the figures may be adjusted from that shown. Furthermore, this Application is intended to cover such departures from the present disclosure as come within known or customary practices in the art to which this invention pertains and which fall within the limitations of the appended claims. Those skilled in the art should now appreciate that various adaptations and modifications of the examples and alternative embodiments described above can be configured without departing from the scope and spirit of the invention. Therefore, it is to be understood that, within the scope of the appended claims, the invention may be practiced other than as specifically described herein.

What is claimed is:

1. A level, comprising:
   a level body supporting a level vial; and
   an end cap releasably connected to the level body;
   wherein the end cap includes an actuator and a detent;
   the detent is operatively associated with the level body to releasably retain the end cap on the level body;
   the level body defines a level volume; and
   wherein the actuator is disposed outside the level volume.

2. The level claimed in claim 1, wherein the detent is laterally spaced from the actuator.

3. The level claimed in claim 2, wherein the detent and actuator are connected via a living hinge.

4. The level claimed in claim 3, wherein:
   the end cap includes an end cap body;
   the end cap body defines the actuator, the living hinge and the detent; and
   wherein the end cap body is formed as a single unitary structure.

5. The level claimed in claim 4, wherein:
   the level body includes a detent-retaining portion; and
   wherein the living hinge biases the detent into engagement with the detent-retaining portion to releasably retain the end cap on the level body.

6. The level claimed in claim 5, wherein the actuator is operative to cause the living hinge to withdraw the detent from engagement with the detent-retaining portion.

7. The level claimed in claim 6, wherein:
   the detent-retaining portion includes a detent aperture formed in the level body; and
   wherein the detent cooperates with the detent aperture to releasably retain the end cap on the level body.

8. The level claimed in claim 7, wherein:
   the end cap body defines a cavity; and
   wherein, when an operator presses the actuator against the bias of the living hinge, the detent is forced inwardly into the cavity and out of engagement with an edge of the detent aperture to allow the end cap to be withdrawn from the level body.

9. The level claimed in claim 8, wherein:
   the end cap defines two opposing living hinge sets of actuators and detents, each living hinge set including a living hinge connecting an actuator to a corresponding detent; and
   wherein the level body defines two opposing detent apertures configured for engagement by respective detents.

10. The level claimed in claim 9, further comprising:
    a shock-absorbing member disposed on an end of the end cap body; and
    wherein the level body is formed from an extruded metal.

11. The level claimed in claim 9, wherein:
    the level body includes two opposing parallel side walls;
    each side wall defines one or more detent apertures;
    each living hinge set includes one or more detents configured for engagement with respective detent apertures; and
    wherein the actuator of each living hinge set is operative to release all of the detents of said living hinge set from their respective detent apertures upon actuation by an operator against the bias of the living hinge of said living hinge set.

12. The level claimed in claim 11, wherein, when all of the detents have been released from their respective detent apertures, an operator may withdraw the end cap from the level body with one hand.

13. The level claimed in claim 1, wherein:
    the level body defines an end aperture; and further comprising:
    an interface disposed within the level body and defining an interface end aperture configured to be aligned with the level body end aperture;
    wherein the interface includes two opposing parallel interface side walls operatively associated with the level body side walls, each interface side wall defining at least one detent aperture; and
    wherein the end cap includes one or more actuators, each actuator operatively associated with a respective detent, and each detent engageable with a respective detent aperture.

14. The level claimed in claim 13, wherein:
    the end cap is configured to be inserted into the interface via the interface end aperture with a sliding fit; and
    wherein, when all of the detents have been released from their respective detent apertures, an operator may withdraw the end cap from the interface with one hand.

15. The level claimed in claim 14, wherein:
    the level body further defines a hang hole;
    the interface defines at least one through-hole in registration with the hang hole when the interface is inserted in the level body; and further comprising:
    a connector including a hollow rivet fixedly connecting the interface to the level body via the hang hole and the at least one through-hole.

16. The level claimed in claim 14, further comprising a connector including a plurality of mating connector detents and connector detent receptors formed on the interface and level body.

17. The level claimed in claim 14, further comprising a connector including a plurality of fasteners fastening the interface to the level body.

18. The level claimed in claim 14, wherein:

the level body has an end portion with a hollow, generally rectangular cross-section;

the level body end aperture is formed in the level body end portion;

the interface is substantially hollow and has a generally rectangular cross-section conforming to the generally rectangular cross-section of the level body end portion;

the end cap body has a generally rectangular cross-section conforming to the generally rectangular cross-section of the interface, and includes two opposing end cap parallel side walls operatively associated with respective interface side walls; and wherein each living hinge set is formed in a respective end cap side wall.

19. A method of removing an end cap from a level including a level body, comprising:

squeezing with the fingers of one hand two opposing actuators formed in the end cap against the bias of respective living hinges to release detents from the edges of detent apertures formed in opposing side walls of the level body, the level body supporting a level vial, and the end cap being configured so that the actuators are disposed outside of a volume defined by the level body; and using the same hand to slide the end cap out of the level body without having to touch the level body with either hand.

20. The method claimed in claim 19, wherein:

the level body includes an interface;

the interface includes two opposing side walls operatively associated with the opposing side walls of the level body;

the detent apertures are formed in the opposing interface side walls and are configured to be engaged by respective detents of the end cap;

wherein the end cap is configured to be inserted into, and removed from, the interface with a sliding fit.

\* \* \* \* \*